(No Model.)

F. E. SMITH.
TRANSPLANTER.

No. 374,092. Patented Nov. 29, 1887.

Witnesses.
Chas. R. Burr,
A. J. Stewart.

Inventor.
Frank E. Smith
by Franck N. Johns
his Attorney.

N. PETERS. Photo-Lithographer, Washington, D. C.

UNITED STATES PATENT OFFICE.

FRANK E. SMITH, OF RAISIN, MICHIGAN.

TRANSPLANTER.

SPECIFICATION forming part of Letters Patent No. 374,092, dated November 29, 1887.

Application filed July 13, 1887. Serial No. 244,182. (No model.)

*To all whom it may concern:*

Be it known that I, FRANK E. SMITH, a citizen of the United States, residing at Raisin, in the county of Lenawee and State of Michigan, have invented certain new and useful Improvements in Transplanters; and I do hereby declare the following to be a full, clear, and exact description of the invention, such as will enable others skilled in the art to which it appertains to make and use the same.

My invention relates to certain improvements in transplanters; and it consists in certain novel construction and arrangement of the various parts, all of which I will now proceed to point out and describe, reference being had to the accompanying drawings, in which—

Figure 1:
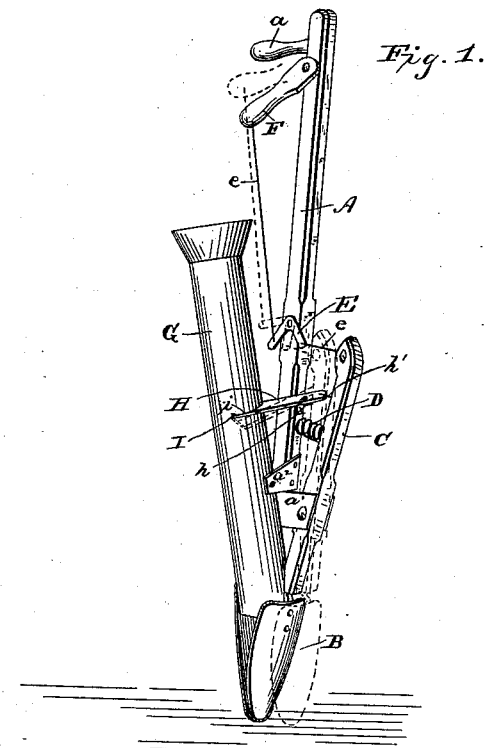
Figure 2:
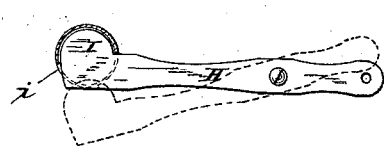

Figure 1 is a perspective of my said invention; Fig. 2, a detail.

Referring to said drawings, A represents a suitable standard, provided near its upper end with a handle, $a$.

B is a trowel-shaped planter secured to the lower end of the standard.

$a'$ is a bracket or arm secured to and projecting from the standard near its lower end.

C is a lever fulcrumed in the end of the bracket. To the lower end of this lever is secured a trowel-shaped planter, B'.

D is a spring placed between the standard and lever above the bracket. This spring serves to force the upper and long arm of the lever out from the standard and hold the points of the planters normally together.

E is a bell-crank lever fulcrumed on the standard. One arm of this lever is connected with the upper end of the lever C by a rod, $e$. The other end of the lever E is connected with a lever, F, fulcrumed on the upper end of the standard near the handle by a rod, $e$. By drawing the lever F up the planters are opened, as shown in dotted lines.

G is a plant-receiving tube secured to the standard by a bracket, $a^2$. The upper end of the tube is provided with a flaring mouth. The lower end of the tube is located between the planters.

H is a lever fulcrumed on a short arm, $h$, secured to the standard. One end of the lever H is connected with the lever C by a rod, $h'$. On the other end of the lever is a cut-off valve, I, which extends through a slot, $i$, in the tube G, said valve being normally closed.

The operation of my invention is as follows: The planters are forced into the ground the desired distance. A plant is placed in the mouth of the receiving-tube and rests upon the cut-off valve. The lever F is then pulled up, opening the planters, as shown in dotted lines, and at the same time opening the valve in the tube and permitting the plant to fall into the hole made for its reception. The planters are then withdrawn from the ground and earth is pressed around the plant by the operator with his foot, or in any other manner. By means of the cut-off valve the plant is not dropped between the planters until they have been forced into the ground and the hole has been made, thus preventing any possibility of injury to the plant.

Having thus fully described my invention, I claim as new and desire to secure by Letters Patent—

In a transplanter, the standard A, having on its lower end the planter B, the lever C, fulcrumed on a bracket, $a'$, secured to the standard, and having on its lower end the planter B', the spring D, located between the standard A and the lever C and holding the planters normally closed, the bell-crank lever E, fulcrumed on the standard and connected with the lever C by the rod $e$, the lever F, fulcrumed on the upper end of the standard and connected with the lever E by the rod $e$, in combination with the plant-receiving tube G, having the cut-off valve I, the lever H, secured at one end to the cut-off valve I, and connected with the levers C by the rod $h'$, all constructed, arranged, and operating substantially as described and shown.

In testimony whereof I affix my signature in presence of two witnesses.

FRANK E. SMITH.

Witnesses:
LESTER H. SALSBURY,
OSCAR WILBER.